(12) United States Patent
Burke

(10) Patent No.: US 9,987,903 B2
(45) Date of Patent: Jun. 5, 2018

(54) REFRIGERANT ALLOCATION BETWEEN AUTOMOTIVE HVAC AND ENGINE AIR/FUEL COOLING

(71) Applicant: Fredrico Burke, Alhambra, CA (US)

(72) Inventor: Fredrico Burke, Alhambra, CA (US)

( * ) Notice: Subject to any disclaimer, the term of this patent is extended or adjusted under 35 U.S.C. 154(b) by 382 days.

(21) Appl. No.: 14/942,576

(22) Filed: Nov. 16, 2015

(65) Prior Publication Data
US 2016/0068037 A1  Mar. 10, 2016

Related U.S. Application Data

(63) Continuation-in-part of application No. 14/076,253, filed on Nov. 10, 2013, now Pat. No. 9,186,953, which is a continuation-in-part of application No. 13/135,062, filed on Jun. 24, 2011, now Pat. No. 9,261,056.

(51) Int. Cl.
| | | |
|---|---|---|
| *F02M 15/00* | (2006.01) | |
| *B60H 1/00* | (2006.01) | |
| *F01P 3/20* | (2006.01) | |
| *F02B 51/00* | (2006.01) | |
| *F02B 29/04* | (2006.01) | |
| *F02M 31/20* | (2006.01) | |

(52) U.S. Cl.
CPC ..... *B60H 1/00028* (2013.01); *B60H 1/00271* (2013.01); *F01P 3/20* (2013.01); *F02B 29/0443* (2013.01); *F02B 51/00* (2013.01); *F02M 31/20* (2013.01); *B60H 2001/00307* (2013.01); *F01P 2060/02* (2013.01); *F01P 2060/08* (2013.01); *F01P 2060/10* (2013.01); *Y02T 10/126* (2013.01); *Y02T 10/146* (2013.01)

(58) Field of Classification Search
CPC ........... B60H 1/00028; B60H 1/00271; B60H 2001/00307; F01P 3/20; F01P 2060/02; F01P 2060/08; F01P 2060/10; F02B 29/0443; F02B 51/00; F02M 31/20
USPC ......................................... 123/540, 541, 542
See application file for complete search history.

(56) References Cited

U.S. PATENT DOCUMENTS

| | | | |
|---|---|---|---|
| 3,141,293 A | | 7/1964 | Crooks |
| 3,882,692 A | * | 5/1975 | Watanabe ............... F02M 31/20 123/41.22 |
| 4,169,436 A | | 10/1979 | Welch et al. |
| 4,491,117 A | | 1/1985 | Koide |
| 4,875,439 A | * | 10/1989 | Widmer ................. F02M 31/20 123/541 |
| 4,938,036 A | * | 7/1990 | Hodgkins .............. F02M 31/20 123/541 |

(Continued)

*Primary Examiner* — David Hamaoui
*Assistant Examiner* — Syed O Hasan
(74) *Attorney, Agent, or Firm* — Kenneth L. Green; Averill & Green

(57) ABSTRACT

An engine fuel and air cooling system for vehicles exchanges heat between a coolant and air conditioning system refrigerant. The system provides a cabin cooling only mode, a cabin and engine fuel and air cooling mode, and an engine fuel and air cooling only mode. A refrigerant distribution manifold distributes the refrigerant for each mode. The engine fuel and air cooling is provided to a supercharger intercooler to cool air provided to the engine, and to fuel rails to cool fuel provided to the engine. In one embodiment the fuel rails include an inner fuel path surrounded by a coolant path to cool the fuel provided to fuel injectors.

14 Claims, 9 Drawing Sheets

(56) References Cited

U.S. PATENT DOCUMENTS

| | | | |
|---|---|---|---|
| 6,041,763 A * | 3/2000 | Akyildiz | C10G 32/02 |
| | | | 123/538 |
| 6,269,804 B1 | 8/2001 | Braun et al. | |
| 6,854,513 B2 | 2/2005 | Shirota et al. | |
| 7,367,292 B2 | 5/2008 | Vath | |
| 7,621,150 B2 | 11/2009 | Kadle et al. | |
| 7,637,292 B2 | 12/2009 | Handa | |
| 7,658,183 B1 | 2/2010 | Johnson | |
| 2005/0056470 A1 | 3/2005 | Jeong | |
| 2007/0006853 A1 | 1/2007 | Fults et al. | |
| 2009/0166022 A1 | 7/2009 | Desai et al. | |

* cited by examiner

REFRIGERANT ALLOCATION BETWEEN AUTOMOTIVE HVAC AND ENGINE AIR/FUEL COOLING

CROSS-REFERENCE TO RELATED APPLICATIONS

The present application is a Continuation in Part of U.S. patent application Ser. No. 13/135,062, filed Jun. 24, 2011 and is a Continuation in Part of U.S. patent application Ser. No. 14/076,253 filed Nov. 10, 2013, which applications are incorporated in its entirety herein by reference.

BACKGROUND OF THE INVENTION

The present invention relates to internal combustion engines and in particular to reducing the temperature of fuel and air provided to the engines to improve performance.

Many modern vehicles have small displacement supercharged or turbo charged engines to improve mileage, or moderate to large displacement supercharged or turbo charged engines to improve performance. An unavoidable consequence of supercharging or turbo charging is an increase in intake air temperature. The increased air temperature may cause detonation (e.g., pre-ignition or pinging) under acceleration when the fuel air mixture is ignited prematurely, and limits the amount of boost (increased air pressure) which may be used. Uncontrolled detonation may damage or destroy the engine.

Heat enchanters, commonly referred to as intercoolers, are often added to supercharged or turbo charged engines between the supercharger or turbo charger and the engine to at least somewhat cool the intake air. These intercoolers maybe air to air, or air to coolant. The air to coolant intercoolers require a second coolant to air heat exchanger in an ambient air stream to cool the coolant. Unfortunately, it is often difficult to obtain the desired amount of cooling with known intercoolers, thus limiting potential of the supercharger of turbo charger to increase performance.

Additionally, detonation may be reduced by cooling the liquid fuel provided to the engine, having a similar effect as cooling the intake air. Common methods for cooling liquid fuel include containers filled with ice and coiled fuel lines passing through the containers. Unfortunately, the fuel may be immediately heated upon leaving the container, and the ice melts quickly, making this approach only useful for a very brief period of time.

U.S. Pat. No. 6,269,804 discloses fuel rails having a coolant line running therethrough. Unfortunately, the fuel is exposed to the fuel rail housing, and presence of the coolant line provides very little reduction in fuel temperature.

BRIEF SUMMARY OF THE INVENTION

The present invention addresses the above and other needs by providing an engine fuel and air cooling system for vehicles which exchanges heat between a coolant and air conditioning system refrigerant. The system provides a cabin cooling only mode, a cabin and engine fuel and air cooling mode, and an engine fuel and air cooling only mode. A refrigerant distribution manifold distributes the refrigerant for each mode. The engine fuel and air cooling is provided to a supercharger intercooler to cool air provided to the engine, and to fuel rails to cool fuel provided to the engine. In one embodiment the fuel rails include an inner fuel path surrounded by a coolant path to cool the fuel provided to fuel injectors.

In accordance with one aspect of the invention, there is provided a fuel and air cooling system including primary and secondary expansion valves for fuel and air cooling. The primary expansion valve is sized to operate with the cabin air conditioning on and is generally between 0.25 and one tons. The secondary expansion valve is sized between 1.5 and 2 ton to operate with the primary expansion valve when the cabin air conditioning of off. Thus, the combined primary and secondary fuel and air circuit expansion valve tonnage is between 1.75 and 3 tons.

In accordance with another aspect of the invention, there is provided a fuel and air cooling system including a manifold block. A cabin valve, primary and secondary fuel and air circuit valves, and primary and secondary fuel and air circuit expansion valves reside in a manifold block. The manifold block provide a compact and efficient arrangement of the cabin valve, the primary and secondary fuel and air circuit valves, and the primary and secondary fuel and air circuit expansion valves. Because modern vehicles have only limited space for added equipment, the compact arraignment of the cabin valve, the primary and secondary fuel and air circuit valves, and the primary and secondary fuel and air circuit expansion valves is important in adapting the fuel and air cooling system to many vehicles.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

The term "fuel" is used herein to refer to liquid fuel (gasoline, diesel, alcohol and the like) mixed with air for combustion in internal combustion engines.

The term "supercharger" is used hereafter to refer to any type of forced induction device including belt driven superchargers and turbo superchargers.

The term "refrigerant" is used herein to refer to common refrigerants used in automotive air conditioning systems. Preferred refrigerants have a vaporization temperature at or below −61 degrees Fahrenheit at ambient pressure.

The term "coolant" is used herein to refer to common liquid coolant used to cool internal combustion engines. These include, water, glycol, a water and rust inhibitor mix, a water glycol mix, and the like. Coolants have a vaporization temperature above 212 degrees Fahrenheit at ambient pressure.

Figure 1:
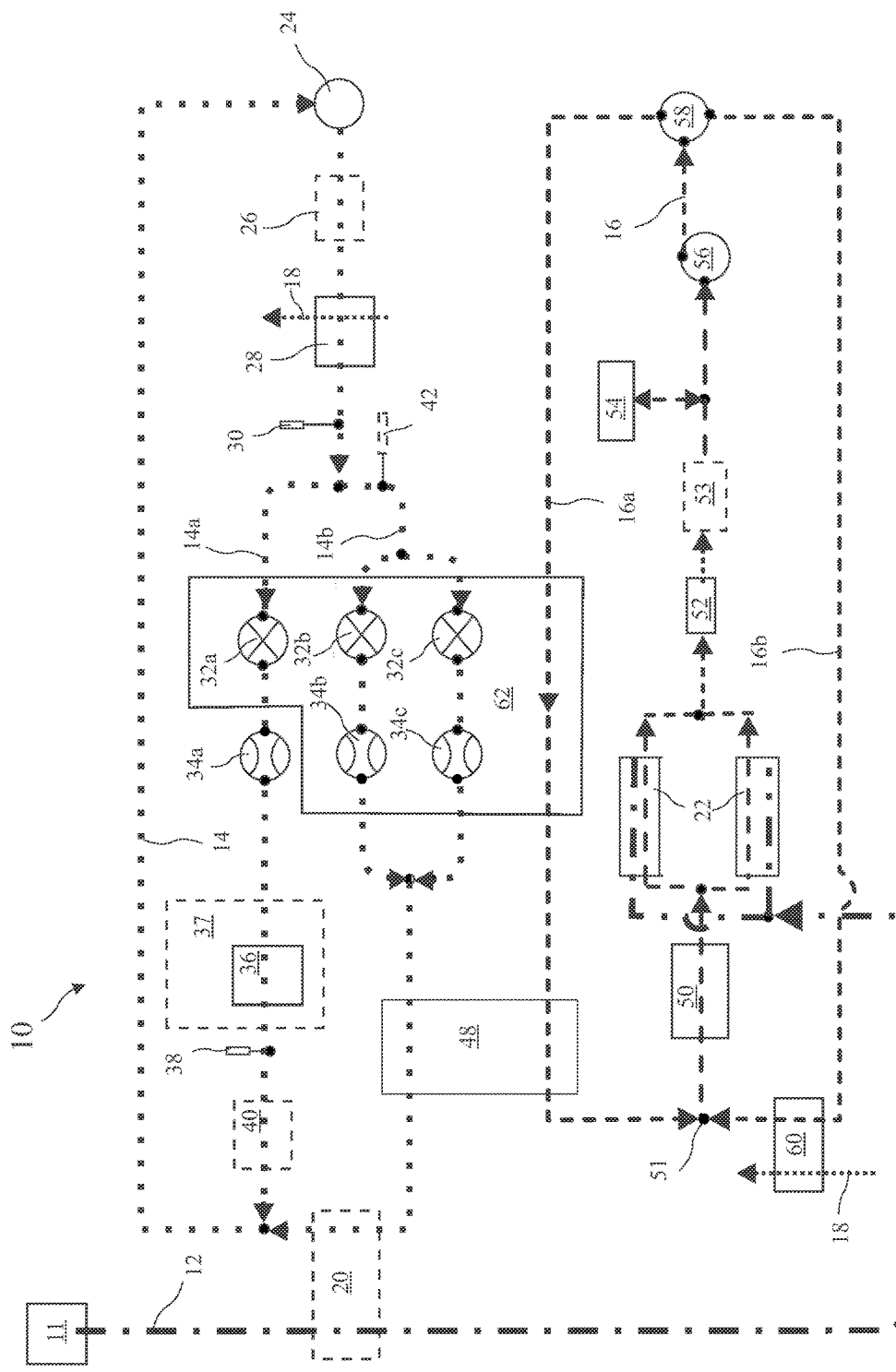
FIG. 1 is a general diagram of a fuel and air cooling system according to the present invention, for use with an internal combustion engine.

A general diagram of a fuel and air cooling system 10 according to the present invention, for use with an internal combustion engine, is shown in FIG. 1. The fuel and air cooling system 10 includes a flow of fuel 12 from a fuel tank 11, a flow of refrigerant 14, a flow of coolant 16, and flows of ambient air 18. The refrigerant 14 starts at a compressor 24 which compresses the refrigerant. The compressed coolant 14 passed through an optional accessory heater 26. The optional accessory heater 26 may provide heat for ancillary functions, such as beverage heating, glove heating, etc. The compressed refrigerant 14 then passes through a condenser 28. The condenser 28 also receives a flow of ambient air 18 and acts as a heat exchanger to cool the refrigerant 14. A high pressure cutout 30 follows the condenser 28 and stops the compressor 24 whenever the refrigerant pressure becomes excessive. The refrigerant 14 then splits between a flow of cabin refrigerant 14a and a flow of fuel and air refrigerant 14b.

The flow of cabin refrigerant 14a passes through a cabin air conditioning system including a cabin circuit valve 32a and then a cabin circuit expansion valve 34a, a cabin heat exchanger (also called an evaporator coil) 36 residing in or proximal to a vehicle cabin 37, a cabin thermostat 38, and optionally, a heat exchanger 40 for cooling fuel, oil, coolant, beverages, and the like.

The flow of fuel and air refrigerant 14b is separated into two parallel flows to pass through a fuel system including a primary fuel and air circuit valve 32b and then a primary fuel and air circuit expansion valve 34b, and secondary fuel and air circuit valve 32c and then a secondary fuel and air circuit expansion valve 34c, and then recombine. The recombined flow of fuel and air refrigerant 14b passed through a heat exchanger 48, optionally through a fuel pre-cooler 20, and re-joins the flow of cabin refrigerant 14a at refrigerant node 41 to return to the compressor 24.

The coolant 16 is circulated by a pump 56. The coolant 16 splits into a flow of refrigerated coolant 16a and a flow of air cooled coolant 16b. The refrigerated coolant 16a passes through the heat exchanger 48 where it is cooled by the fuel and air refrigerant 14b. The air cooled coolant 16b passed through a heat exchanger (radiator) 60 where it is cooled by the flow of ambient air 18. After being cooled, the refrigerated coolant 16a and air cooled coolant 16b join at coolant node 51, and flow sequentially through an intake air intercooler 50 and fuel rails 22. Supercharging heats the air compressed in the supercharger and the intercooler 50 is preferably, but not necessarily, a supercharger intercooler and cools air compressed by a supercharger before entry into an engine. The flow of coolant through the fuel rails 22 cools the fuel 12 before injection into the engine. The coolant flow 16 then proceeds through a sight glass and filter 52, optionally through an intake air pre-cooler 53, past an expansion/reservoir tank 54, and back to the coolant pump 56.

Figure 7:
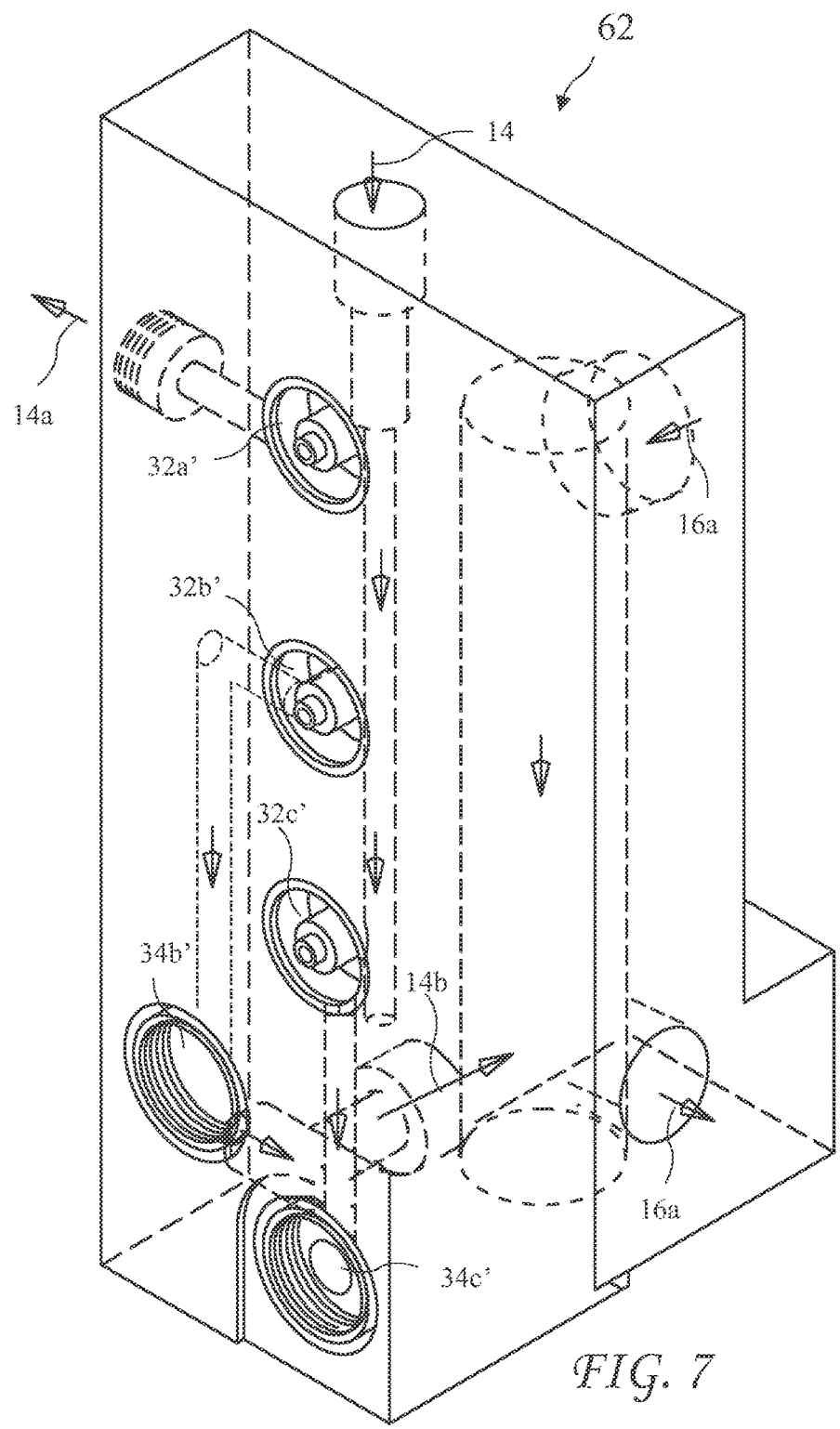
FIG. 7 shows a refrigerant manifold according to the present invention.

A refrigerant manifold 62 preferably houses the solenoid valves 32a, 32b, and 32c, and the expansion valves 34b and 34c. The cabin circuit expansion valve 34a is preferably the original equipment expansion valve of the vehicle the fuel and air cooling system 10 is installed in. The refrigerated coolant 16a preferably passes through the refrigerant manifold 62 to cool the refrigerant manifold 62. Details of the refrigerant manifold 62 are shown in FIG. 7. The primary expansion valve 34b is sized to operate with the cabin air conditioning on and is generally between 0.25 and one tons (or 3,000 to 12,000 BTUs). The secondary expansion valve 34c is sized between 1.5 and 2 ton (or 18,000 to 24,000 BTUs) to operate with the primary expansion valve when the cabin air conditioning is off.

Figure 2:
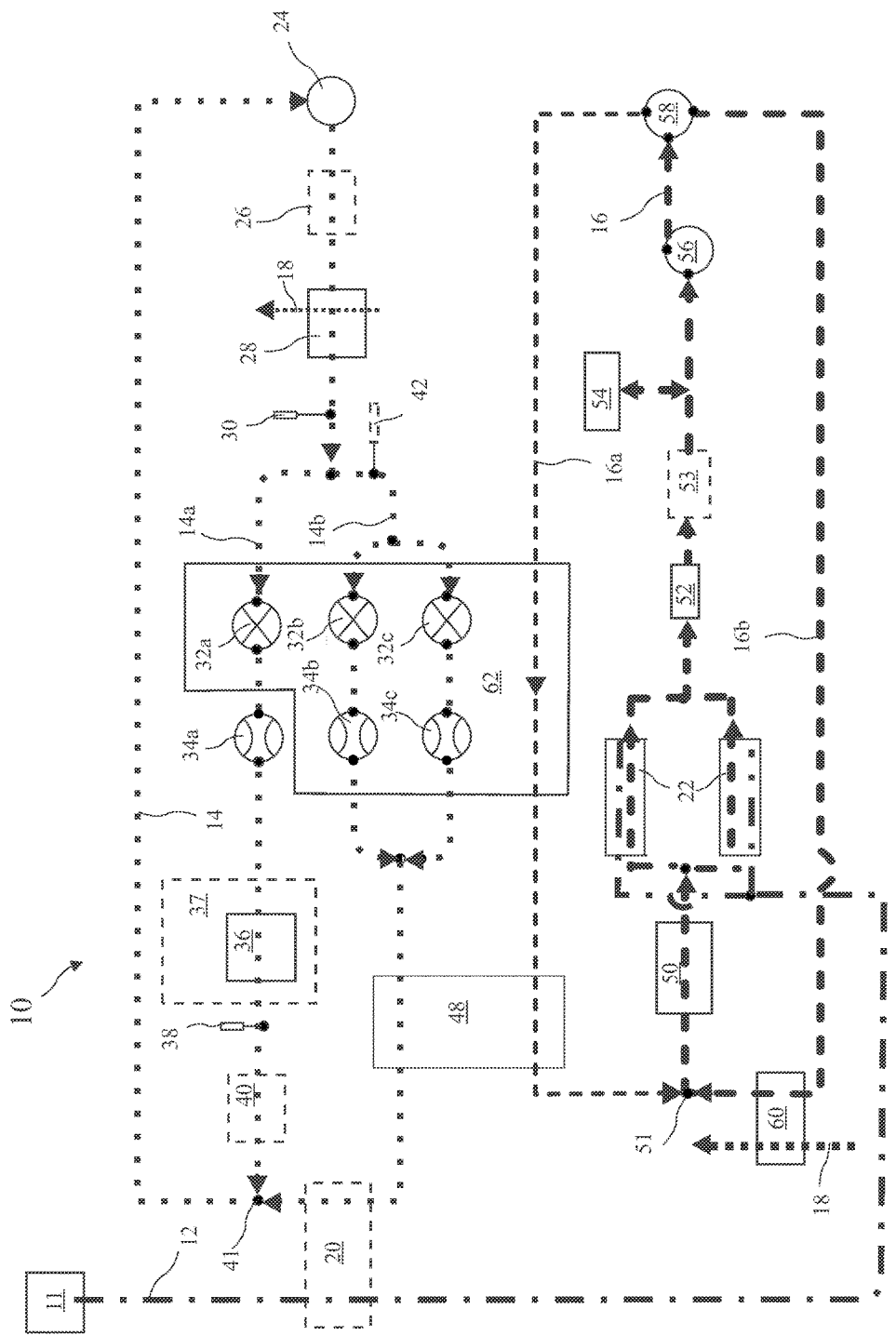
FIG. 2 is a diagram of the fuel and air cooling system according to the present invention, with refrigerant cool features turned off.

A diagram of a fuel and air cooling system 10 with refrigerant cooling features (e. g., the compressor 24) turned off is shown in FIG. 2. The only active fuel and air cooling path is the air cooled coolant 16b through the heat exchanger 60 shown as heavier lines. The air cooled coolant 16b passed through the heat exchanger 60 where it is cooled by the flow of ambient air 18. After being cooled, the air cooled coolant 16b flows sequentially through the supercharger intercooler 50 and fuel rails 22. The intercooler 50 cools the air compressed by the supercharger before entry into the engine. The flow of the air cooled coolant 16b through the fuel rails 22 cools the fuel 12 before injection into the engine. The coolant flow 16 then proceeds through the sight glass and filter 52, optionally through the intake air pre-cooler 53, past an expansion/reservoir tank 54, and back to the coolant pump 56.

Figure 3:
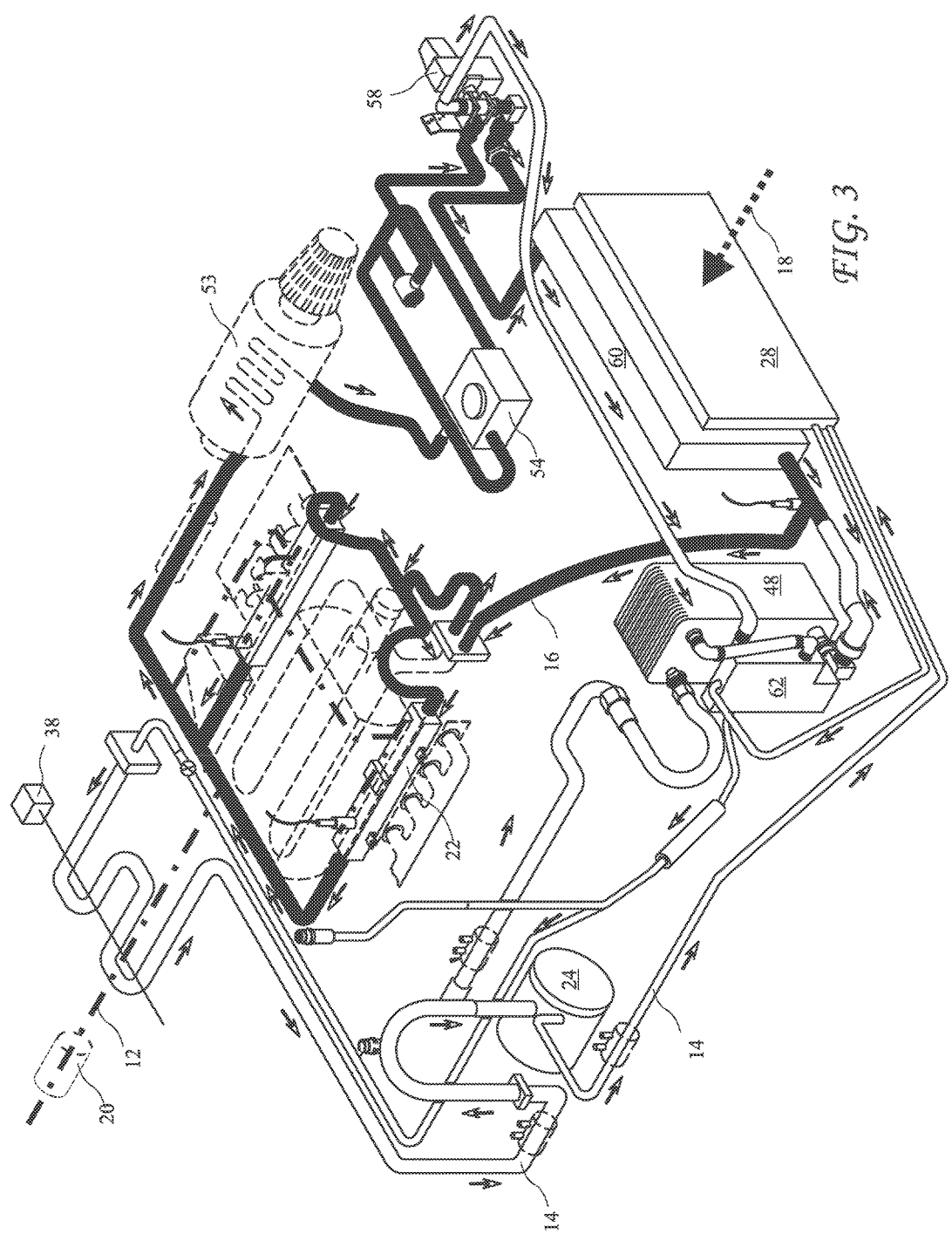
FIG. 3 shows a typical physical layout of the fuel and air cooling system according to the present invention, with refrigerant cool features turned off.

An example of a physical layout of the fuel and air cooling system 10, in the fuel and air cooling mode of FIG. 2, is shown in FIG. 3.

Figure 4:
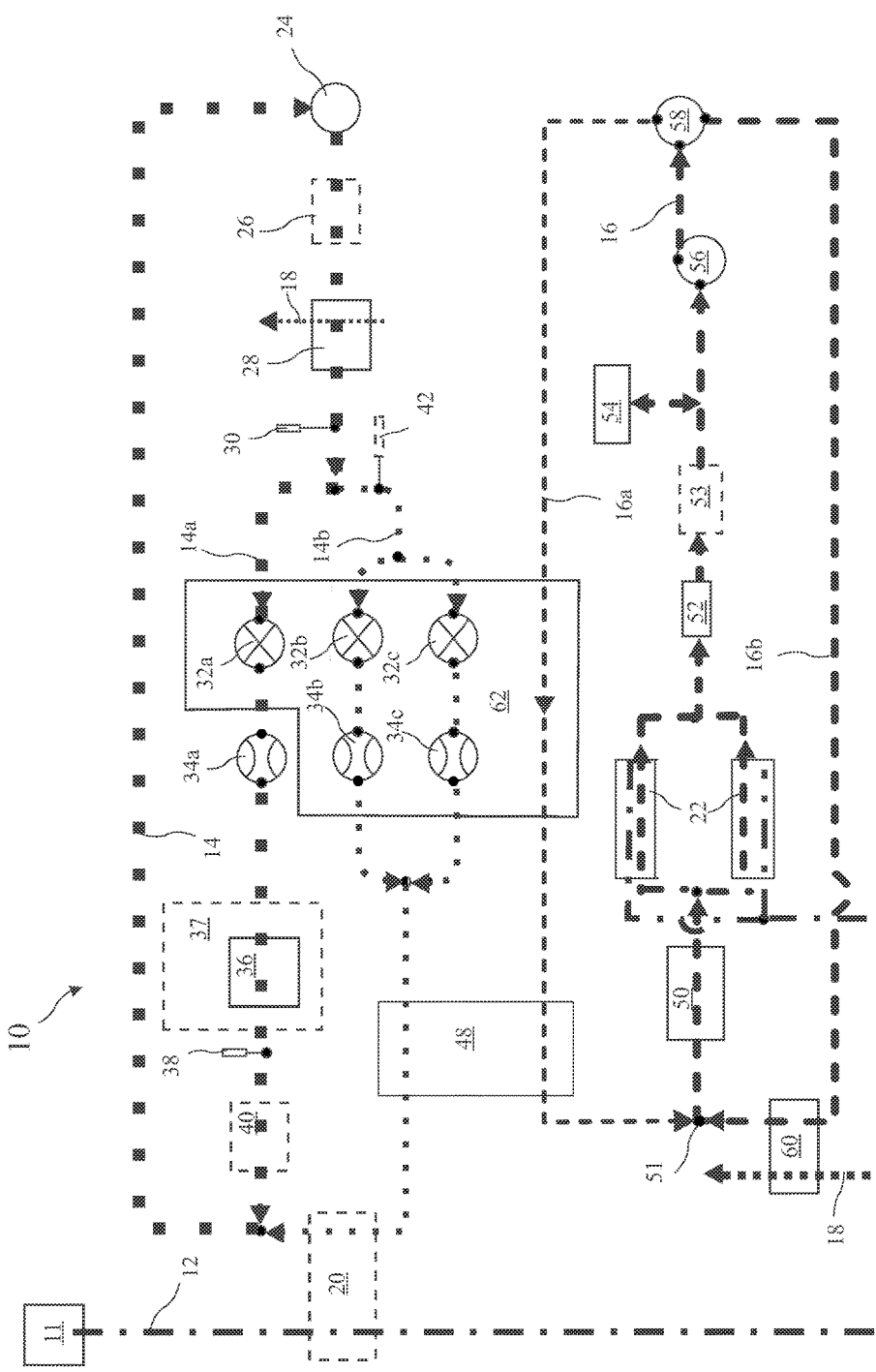
FIG. 4 is a diagram of the fuel and air cooling system according to the present invention, with refrigerant cooling provided to cabin interior only.

A diagram of a fuel and air cooling system 10 with refrigerant cooling only provided for the cabin 37 is shown in FIG. 4. The only active fuel and air cooling path is the air cooled coolant 16b through the heat exchanger 60 shown as heavier lines. The cabin circuit solenoid valve 34a is open allowing the cabin refrigerant 14a to flow freely, and the primary and secondary fuel and air circuit solenoid valves 34b and 34c are closed. The cabin refrigerant 14a flows through the cabin circuit expansion valve, the cabin heat exchanger 36, and back to the compressor 24.

Figure 5:
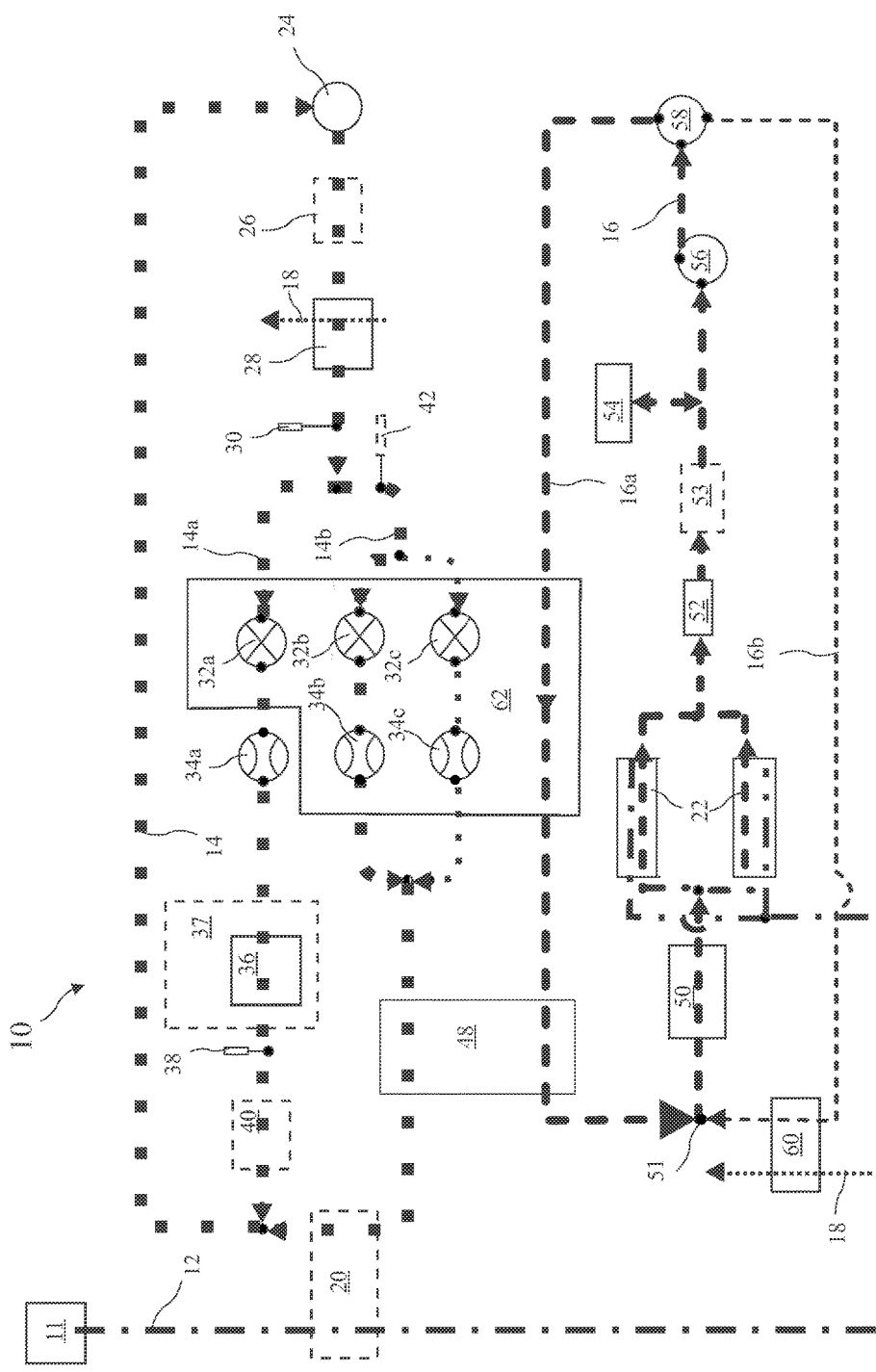
FIG. 5 is a diagram of the fuel and air cooling system according to the present invention, with refrigerant cooling provided to cabin interior and partially to the fuel and air.

A diagram of the fuel and air cooling system 10, with refrigerant cooling provided to cabin interior and the fuel and air is shown in FIG. 5. The cabin circuit solenoid valve 34a is open allowing the cabin refrigerant 14a to flow freely, and the primary fuel and air circuit solenoid valve 34b is open allowing a partial flow of fuel and air refrigerant. The secondary fuel and air circuit solenoid valve 34c is closed. The cabin refrigerant 14a flows through the cabin circuit expansion valve, the cabin heat exchanger 36, and back to the compressor 24. The fuel and air refrigerant 14b flows through the primary fuel and air circuit expansion valve 34b and through the refrigerant to coolant heat exchanger 48, and then joins the cabin refrigerant 14a and returns to the compressor 24.

The coolant pump 56b pumps the coolant 16 to the two way valve 58 which is set to allow the refrigerated coolant 16a to pass through the coolant heat exchanger 48 to be cooled by the fuel and air refrigerant 14b. After being cooled, the refrigerated coolant 16a flows sequentially through the supercharger intercooler 50 and fuel rails 22. In the intercooler 50, the refrigerated coolant 16a cools the air compressed by the supercharger before entry into the engine. The refrigerated coolant 16a flows through the fuel rails 22 to cool the fuel 12 before injection into the engine. The coolant flow 16 then proceeds through the sight glass and filter 52, optionally through the intake air pre-cooler 53, past an expansion/reservoir tank 54, and back to the coolant pump 56.

Figure 6:
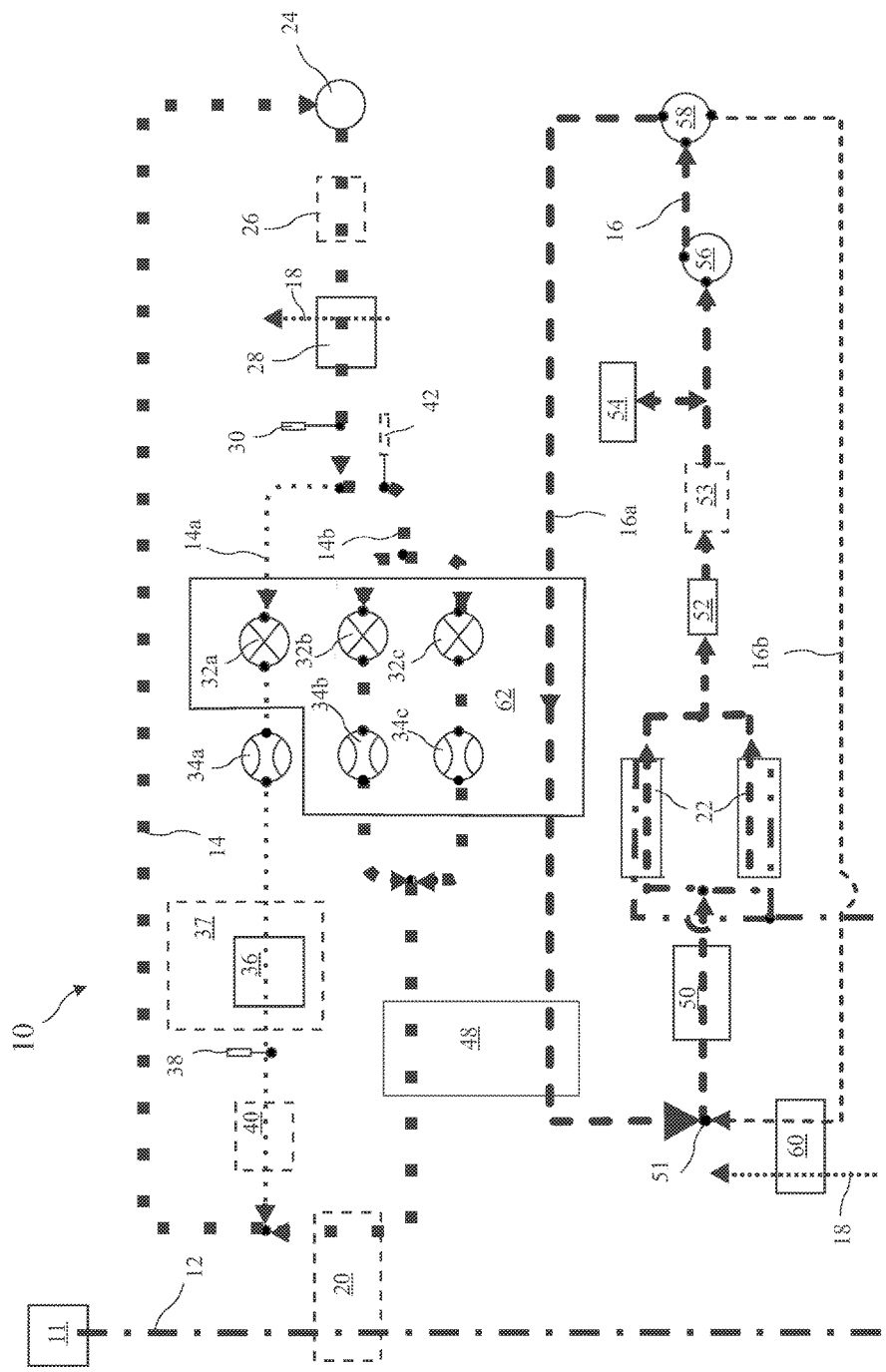
FIG. 6 is a diagram of the fuel and air cooling system according to the present invention, with refrigerant cooling provided to the fuel and air only.

A diagram of the fuel and air cooling system 10 with refrigerant cooling provided to the fuel and air only is shown in FIG. 6. The cabin circuit solenoid valve 34a is closed preventing the cabin refrigerant 14a from flowing, and the primary and secondary fuel and air circuit solenoid valves 34b and 34c are open allowing a maximum flow of fuel and air refrigerant. The fuel and air refrigerant 14b flows through the primary and secondary fuel and air circuit expansion valves 34b and 43c, and through the refrigerant to coolant heat exchanger 48, and then returns to the compressor 24.

The coolant pump 56b pumps the coolant 16 to the two way valve 58 which is set to allow the refrigerated coolant 16a to pass through the coolant heat exchanger 48 to be cooled by the fuel and air refrigerant 14b. After being cooled, the refrigerated coolant 16a flows sequentially through the supercharger intercooler 50 and fuel rails 22. In the intercooler 50, the refrigerated coolant 16a cools the air compressed by the supercharger before entry into the engine. The refrigerated coolant 16a flows through the fuel rails 22 to cool the fuel 12 before injection into the engine. The coolant flow 16 then proceeds through the sight glass and filter 52, optionally through the intake air pre-cooler 53, past an expansion/reservoir tank 54, and back to the coolant pump 56.

The refrigerant manifold 62 is shown in FIG. 7. The three solenoid valves 32a, 32b, and 32c are located in ports 32a', 32b' and 32c' respectively. The refrigerant 14 enters the refrigerant manifold 62 and connects to the ports 32a', 32b', and 32c'. The valve 32a controls the cabin refrigerant 14a flowing from the refrigerant manifold 62 to the cabin expansion valve 43a residing outside the refrigerant manifold 62. The solenoid valves 32b and 32c control flows of the fuel and air refrigerant to the fuel and air expansion valves 34b and 34c respectively. Flow from the fuel and air expansion valves 34b and 34c combine and exit the refrigerant manifold 62 to the refrigerant to coolant heat exchanger 48 (see FIG. 1). The refrigerated coolant 16a flows though the refrigerant manifold 62 to cool the refrigerant manifold 62.

Figure 8:
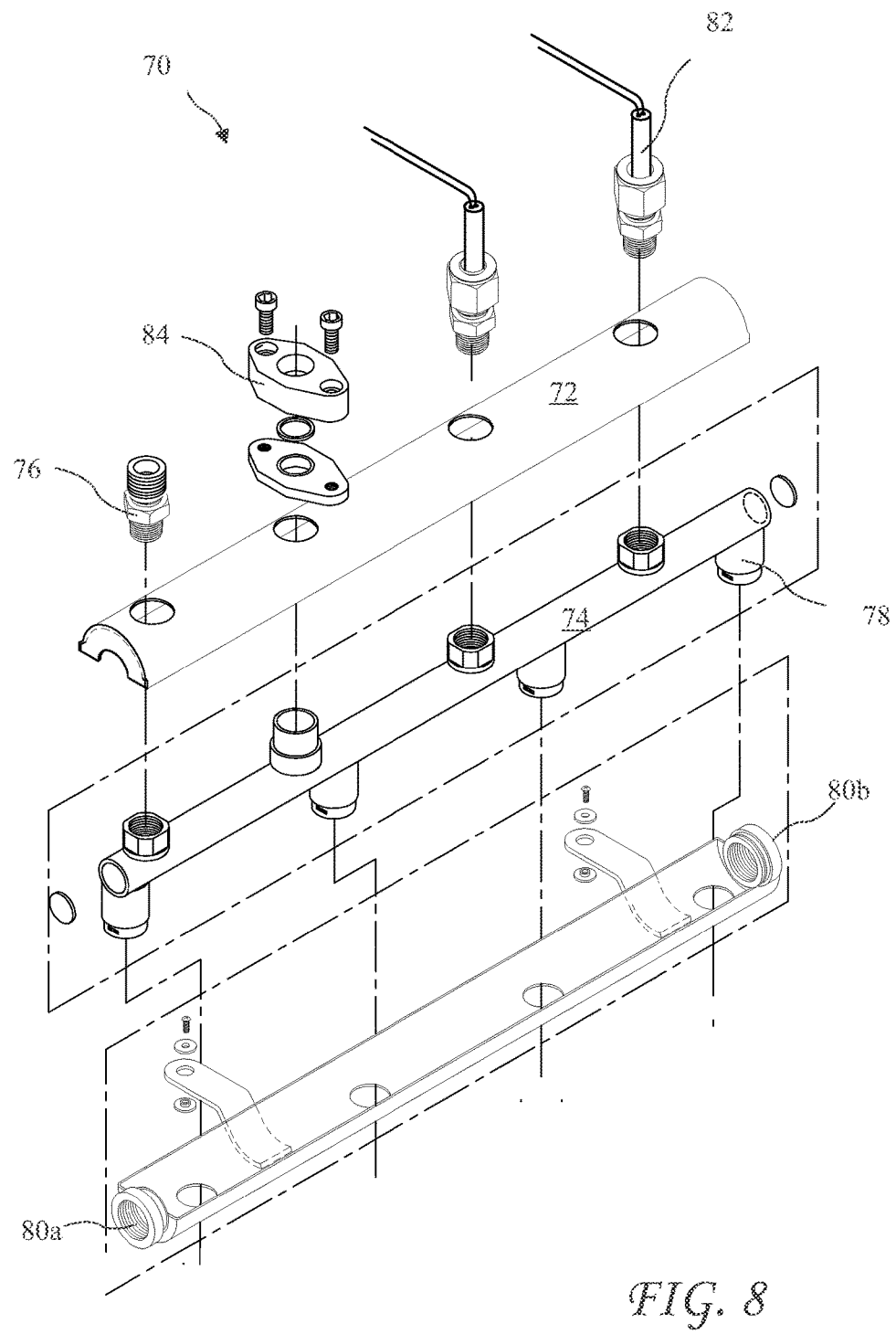
FIG. 8 is an exploded view of a coaxial fuel and coolant rail according to the present invention.

An exploded view of a coaxial fuel and coolant rail 80 is shown in FIG. 8. The rail 80 includes an outer coolant tube 72 and an inner fuel rail 74. The outer coolant tube 72 is shown separated in halves for the purpose of illustration only, and the coaxial fuel and coolant rail 80 may be constructed in other manners. A fuel inlet 76 passes through the outer coolant tube 72 and into the fuel rail 74. Injector hats 78 extend down from the fuel rail 74 and seal to fuel injectors. Coolant inlet 80a and outlet 80b reside at opposite ends of the outer coolant tube 72. At least one temperature sensor 82 extends through the outer coolant tube 72 and into the fuel rail 74 to measure fuel temperature, and a pressure sensor fitting 76 extends through the outer coolant tube 72 and into the fuel rail 74 to measure fuel pressure.

Figure 9:
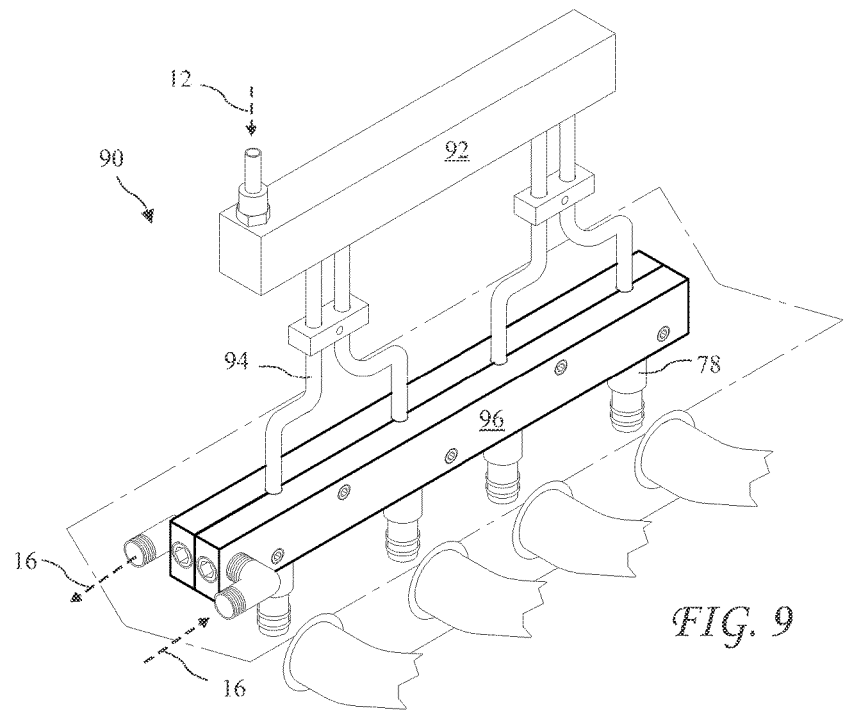
FIG. 9 shows fuel cooling blocks clamped over fuel lines entering fuel injector hats according to the present invention.
Figure 10:
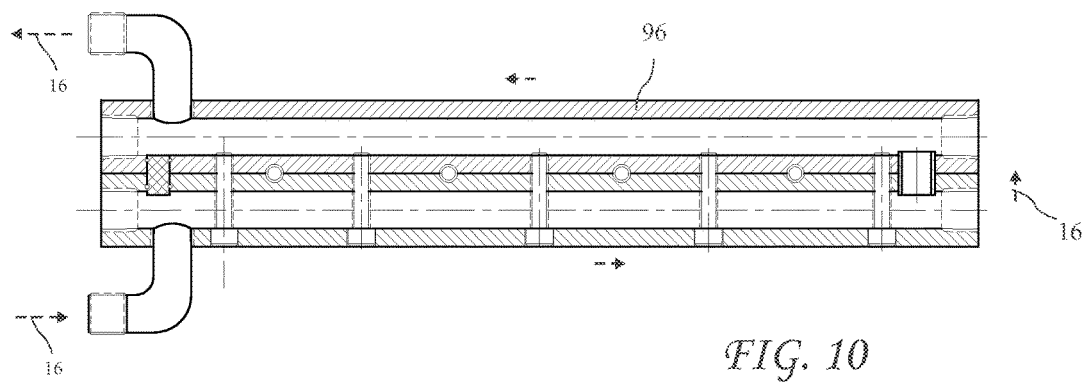
FIG. 10 shows a cross-sectional view of the fuel cooling blocks according to the present invention.

Fuel cooling blocks 96 clamped over fuel lines 94 and fuel injector hats 78 are shown in FIG. 9 and a cross-sectional view of the fuel cooling blocks 96 is shown in FIG. 10. The flow of coolant 16 passes through one side of the fuel cooling blocks 96 and then back through an opposite side. The fuel lines 94 reach from a fuel manifold 92 and into the fuel cooling blocks 96, and the into the fuel injector hats 78, thus cooling the fuel 12 just before injection of the fuel 12 into the engine.

While the invention herein disclosed has been described by means of specific embodiments and applications thereof, numerous modifications and variations could be made thereto by those skilled in the art without departing from the scope of the invention set forth in the claims.

I claim:

1. A fuel and air cooling system for an engine comprising: a refrigerant system cycling refrigerant sequentially through; a refrigerant compressor; a refrigerant condenser; parallel refrigerant paths comprising: a cabin refrigerant path for the refrigerant sequentially through; a cabin valve; a cabin expansion valve; and a cabin heat exchanger; a fuel and air refrigerant path for the refrigerant sequentially through: a fuel and air circuit valve; a fuel and air circuit expansion valve; and a refrigerant to coolant heat exchanger the parallel refrigerant paths joining in a return path to the refrigerant compressor; and a fuel and air coolant system cycling coolant sequentially through: a coolant pump; and in parallel: a refrigerant cooled cooling path for refrigerated coolant sequentially through: the refrigerant to coolant heat exchanger; an intake air intercooler; a coolant to fuel heat exchanger in contact with injector hats; and back to the coolant pump; and an air cooled cooling path for air cooled coolant sequentially thorough: an air to coolant heat exchanger; the intake air intercooler; the coolant to fuel heat exchanger in contact with the injector hats; and back to the coolant pump.

2. The fuel and air cooling system for an engine of claim 1, wherein a two way valve places the refrigerant cooled cooling path and the air cooled cooling path in fluid communication to receive the coolant from the coolant pump.

3. The fuel and air cooling system for an engine of claim 1, wherein a two way valve places only one of the refrigerant cooled cooling path and the air cooled cooling path in fluid communication to receive the coolant from the coolant pump.

4. The fuel and air cooling system for an engine of claim 1, wherein the coolant to fuel heat exchanger in contact with the injector hats comprises at least one co-axial fuel rail carrying a flow of the coolant and a flow of the fuel.

5. The fuel and air cooling system of the engine of claim 4, wherein the at least one fuel rail is a coaxial fuel rail having an outer tube carrying the coolant and an inner fuel rail inside the outer tube carrying fuel to the engine.

6. The fuel and air cooling system for an engine of claim 1, wherein the coolant to fuel heat exchanger in contact with the injector hats comprises fuel cooling blocks clamped over fuel lines and holding fuel injector hats.

7. The fuel and air cooling system for an engine of claim 1, wherein the fuel and air circuit valve is a primary fuel and air circuit valve and the fuel and air circuit expansion valve is a primary fuel and air circuit expansion valve; and further comprising in parallel with a secondary fuel and air circuit valve in parallel with the primary fuel and air circuit valve and a secondary fuel and air circuit expansion valve in parallel with the primary fuel and air circuit expansion valve.

8. The fuel and air cooling system for an engine of claim 6, wherein the primary fuel and air circuit expansion valve tonnage is rated at between 3,000 to 12,000 BTUs and the combined primary and secondary fuel and air circuit expansion valve tonnage is rated at between 21,000 to 36,000 BTUs.

9. The fuel and air cooling system for an engine of claim 6, wherein the primary fuel and air circuit expansion valve tonnage is rated at between 3,000 to 12,000 BTUs and the secondary fuel and air circuit expansion valve tonnage is rated at between 1,800 to 12,000 BTUs.

10. The fuel and air cooling system for an engine of claim 6, wherein the cabin valve, the primary and secondary fuel and air circuit valves, and the primary and secondary fuel and air circuit expansion valves reside in a manifold block.

11. The fuel and air cooling system for an engine of claim 9, wherein the refrigerated coolant passes through the manifold block.

12. The fuel and air cooling system for an engine of claim 1, wherein the intake air intercooler is a supercharger intercooler in fluid communication with the intake air flow from a supercharger entering the engine.

13. A fuel and air cooling system for an engine comprising: a refrigerant system cycling refrigerant sequentially through; a refrigerant compressor; a refrigerant condenser; parallel refrigerant paths comprising: a cabin refrigerant path for the refrigerant sequentially through; a cabin valve; a cabin expansion valve; and a cabin heat exchanger; a fuel and air refrigerant path for the refrigerant sequentially through: in parallel selectably through: a primary path comprising a primary fuel and air circuit valve and a primary fuel and air circuit expansion valve rated between 3,000 and 12,000 BTUs; and a secondary path comprising a secondary fuel and air circuit valve and a secondary fuel and air circuit expansion valve rated between 18,000 and 24,000 BTUs; the primary and secondary paths joining and passing through a refrigerant to coolant heat exchanger; the parallel refrigerant paths joining in a return path to the refrigerant compressor; a fuel and air coolant system cycling coolant sequentially through: a coolant pump; and in parallel: a refrigerant cooled cooling path for refrigerated coolant through a refrigerant to coolant heat exchanger; and an air cooled cooling path for air cooled coolant passing through an air to coolant heat exchanger; the refrigerant cooled cooling path and the air cooled cooling path joining at a coolant node; a supercharger intercooler; a coolant to fuel heat exchanger in contact with injector hats; and back to the coolant pump.

14. A fuel and air cooling system for an engine comprising: a refrigerant system cycling refrigerant sequentially through; a refrigerant compressor; a refrigerant condenser; parallel refrigerant paths comprising: a cabin refrigerant path for the refrigerant sequentially through; a cabin valve; a cabin expansion valve; and a cabin heat exchanger; a fuel and air refrigerant path for the refrigerant sequentially through: in parallel selectably through: a primary path comprising a primary fuel and air circuit valve and a primary a fuel and air circuit expansion valve; and a secondary path comprising a secondary fuel and air circuit valve and a secondary fuel and air circuit expansion valve; the primary and secondary paths joining and passing through a refrigerant to coolant heat exchanger; the parallel refrigerant paths joining in a return path to the refrigerant compressor; a fuel and air coolant system cycling coolant sequentially through: a coolant pump; and in parallel: a refrigerant cooled cooling path for refrigerated coolant through a refrigerant to coolant heat exchanger; and an air cooled cooling path for air cooled coolant passing through an air to coolant heat exchanger; the refrigerant cooled cooling path and the air cooled cooling path joining at a coolant node; a supercharger intercooler; a coolant to fuel heat exchanger in contact with injector hats; and back to the coolant pump, wherein the cabin valve, the primary fuel and air circuit valve, the primary a fuel and air circuit expansion valve, the secondary fuel and air circuit valve and the secondary a fuel and air circuit expansion valve reside in a single refrigerant manifold.

* * * * *